US012621747B2

(12) United States Patent
Suzuki et al.

(10) Patent No.: US 12,621,747 B2
(45) Date of Patent: May 5, 2026

(54) COMMUNICATION APPARATUS, COMMUNICATION METHOD, AND MULTI-HOP RELAY SYSTEM

(71) Applicant: Sonas, Inc., Tokyo (JP)

(72) Inventors: Makoto Suzuki, Tokyo (JP); Sotaro Ohara, Tokyo (JP)

(73) Assignee: SONAS, INC., Tokyo (JP)

( * ) Notice: Subject to any disclaimer, the term of this patent is extended or adjusted under 35 U.S.C. 154(b) by 41 days.

(21) Appl. No.: 18/538,240

(22) Filed: Dec. 13, 2023

(65) Prior Publication Data

US 2024/0114431 A1     Apr. 4, 2024

Related U.S. Application Data

(63) Continuation of application No. PCT/JP2022/023993, filed on Jun. 15, 2022.

(30) Foreign Application Priority Data

Jun. 16, 2021     (JP) ................................. 2021-100421

(51) Int. Cl.
*H04W 40/28* (2009.01)
*H04W 40/02* (2009.01)
*H04W 40/22* (2009.01)

(52) U.S. Cl.
CPC ......... *H04W 40/28* (2013.01); *H04W 40/023* (2013.01); *H04W 40/22* (2013.01)

(58) Field of Classification Search
None
See application file for complete search history.

(56) References Cited

U.S. PATENT DOCUMENTS

2003/0223401 A1* 12/2003 Lautenschlager ..... H04J 3/0605
                                                    370/351
2013/0208592 A1*  8/2013 Lu ........................ H04L 69/161
                                                    370/231

(Continued)

FOREIGN PATENT DOCUMENTS

JP        2017028653 A      2/2017
JP        2020184730 A      11/2020

(Continued)

OTHER PUBLICATIONS

Ma et al., "Harmony: Saving Concurrent Transmissions from Harsh RF Interference", IEEE INFOCOM 2020—IEEE, Conference On Computer Communications, IEEE, Jul. 6, 2020 (Jul. 6, 2020), pp. 1024-1033, XP033806562, DOI: 10.1109/INFOCOM41043.2020. 9155423 [retrieved on Aug. 3, 2020].

(Continued)

*Primary Examiner* — Mohamed Ibrahim
(74) *Attorney, Agent, or Firm* — Buchanan Ingersoll & Rooney PC

(57)     ABSTRACT

A communication apparatus in a multi-hop relay system in which a packet is transmitted and received using a flooding method in a first flooding slot and a second flooding slot each including a plurality of sub-slots, the communication apparatus performs: switching a frequency channel to be used to transmit and receive a packet between a first sub-slot and a second sub-slot in the first flooding slot; and not switching the frequency channel to be used to transmit and receive a packet within the second flooding slot, but switching the frequency channel to be used to transmit and receive a packet between a plurality of the second flooding slots.

12 Claims, 9 Drawing Sheets

(56) References Cited

U.S. PATENT DOCUMENTS

| | | | | |
|---|---|---|---|---|
| 2015/0341874 A1* | 11/2015 | Nguyen-Dang | .. | H04W 52/0219 |
| | | | | 370/350 |
| 2016/0134539 A1* | 5/2016 | Hui | .......................... | H04L 43/08 |
| | | | | 709/223 |
| 2017/0034791 A1 | 2/2017 | Tohzaka et al. | | |
| 2018/0132182 A1* | 5/2018 | Hanley | ............. | H04W 52/0235 |
| 2020/0100196 A1* | 3/2020 | Raza | ................... | H04L 12/1854 |
| 2020/0314735 A1* | 10/2020 | Aijaz | ................... | H04W 52/46 |
| 2021/0177616 A1 | 6/2021 | Rader et al. | | |

FOREIGN PATENT DOCUMENTS

| | | |
|---|---|---|
| JP | 2020202470 A | 12/2020 |
| JP | 2021177616 A | 11/2021 |

OTHER PUBLICATIONS

Escobar et al., "RedFixHop with channel hopping: Reliable ultra-low-latency network flooding", 2016 Conference On Design of Circuits and Integrated Systems (DCIS), IEEE, Nov. 23, 2016 (Nov. 23, 2016), pp. 1-4, SP033059525, DOI: 10.1109 / DCIS.2016. 7845367 [retrieved on Feb. 6, 2017].

The extended European Search Report issued on Sep. 9, 2024, by the European Patent Office in corresponding European Application No. 22825033.8. (8 pages).

Gao et al., "Efficient Collection Using Constructive-Interference Flooding in Wireless Sensor Networks", Proceedings of the Society Conference of IEICE 2011 communication (2), 428, Aug. 30, 2011.

Ferrari et al., "Efficient Network Flooding and Time Synchronization with Glossy", IPSN'11, 2011.

Suzuki et al., "Structural Monitoring Using Concurrent Transmission Flooding", The Transactions of IEICE B, No. 12, pp. 952-960, 2017.

Suzuki et al., "Structural Monitoring Using Concurrent Transmission Flooding", Transactions of the Institute of Electronics, Information and Communication Engineers B., vol. J100-B No. 12 [online], Dec. 1, 2017.

International Search Report (PCT/ISA/210) with translation and Written Opinion (PCT/ISA/237) mailed on Aug. 2, 2022, by the Japan Patent Office as the International Searching Authority for International Application No. PCT/JP2022/023993. (8 pages).

* cited by examiner

F I G. 2
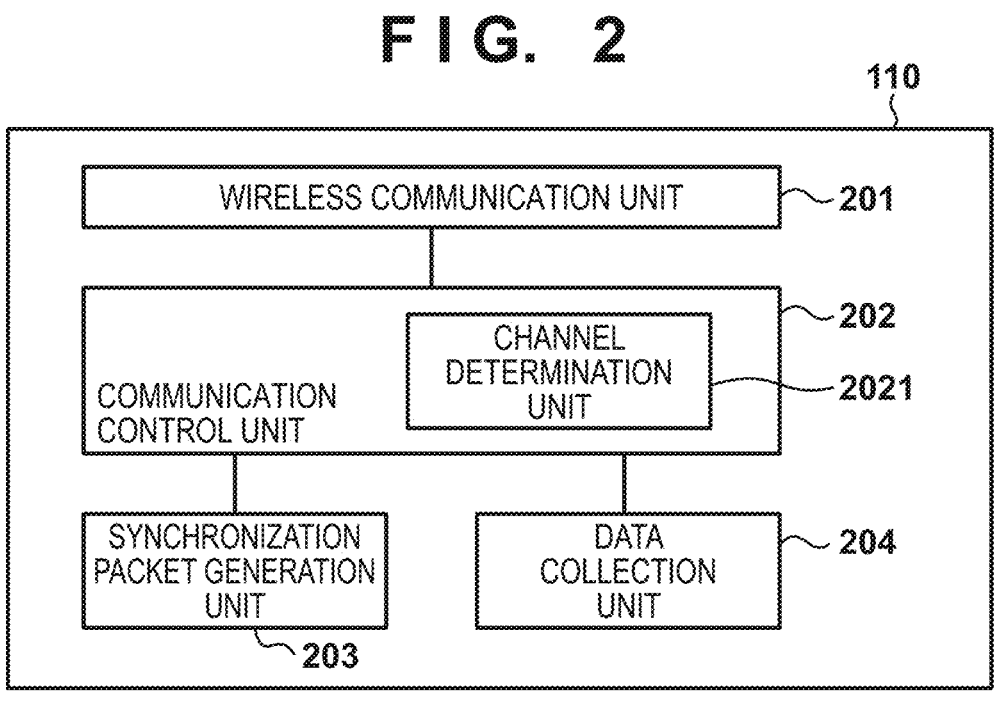
F I G. 3

F I G. 6
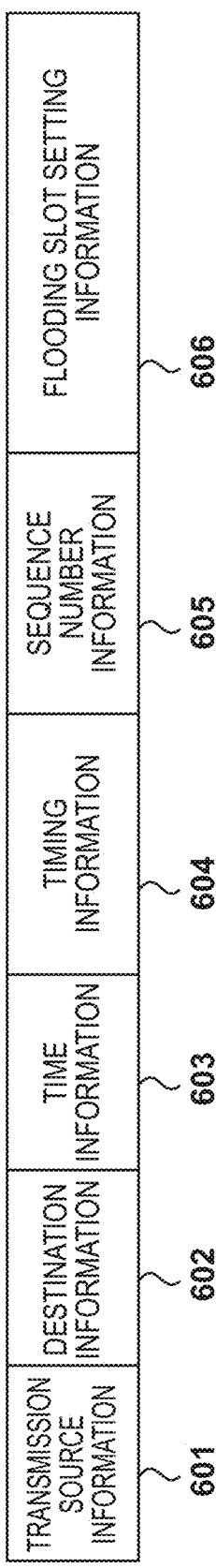
| 601 | 602 | 603 | 604 | 605 | 606 |
|---|---|---|---|---|---|
| TRANSMISSION SOURCE INFORMATION | DESTINATION INFORMATION | TIME INFORMATION | TIMING INFORMATION | SEQUENCE NUMBER INFORMATION | FLOODING SLOT SETTING INFORMATION |

FIG. 8

F I G. 9A
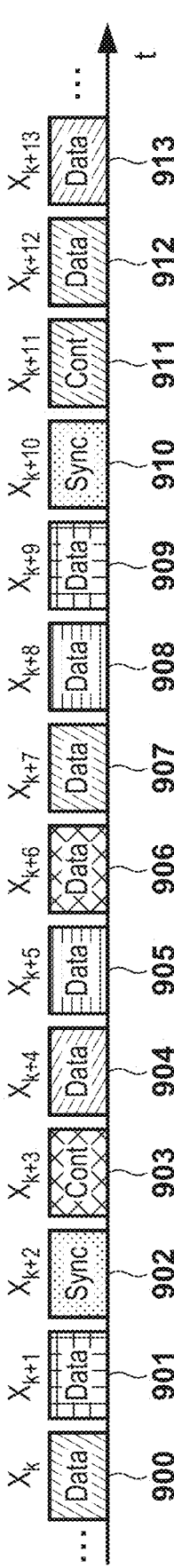

F I G.   9B
902
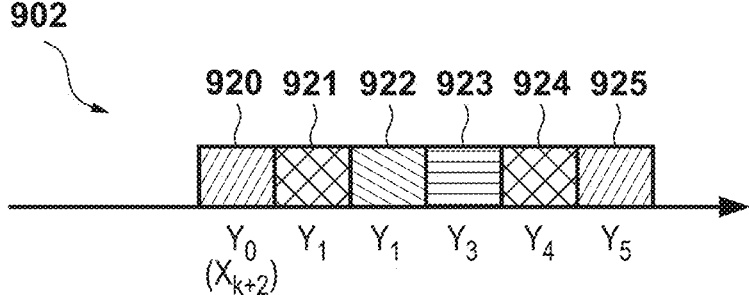

COMMUNICATION APPARATUS, COMMUNICATION METHOD, AND MULTI-HOP RELAY SYSTEM

CROSS-REFERENCE TO RELATED APPLICATION(S)

This application is a continuation of International Patent Application No. PCT/JP2022/023993 filed on Jun. 15, 2022, which claims priority to and the benefit of Japanese Patent Application No. 2021-100421 filed on Jun. 16, 2021, the entire disclosures of which are incorporated herein by reference.

TECHNICAL FIELD

The present invention relates to a communication apparatus that performs communication using a flooding method, a communication method, and a multi-hop relay system.

BACKGROUND ART

A broadcast method called flooding that uses concurrent transmission has been proposed in order to reduce power consumption of sensor nodes and increase the probability of data collection when a plurality of sensor nodes are distributed to collect data (Non-Patent Literature 1).

In the flooding method using concurrent transmission, when one sensor node transmits data, one or more relay nodes that received the transmitted data transmit the same data in a broadcast manner immediately after receiving the data or after a fixed delay, thereby causing concurrent transmission of wireless signals (i.e. causing a plurality of relay nodes to transmit the same wireless signal concurrently or quasi-concurrently). By repeating this more than once, the data can be transmitted over the entire wireless communication system. In the flooding method using concurrent transmission, the same data is transmitted concurrently or quasi-concurrently. This enables the relay nodes to decode signals even if these relay nodes receive the signals from a plurality of nodes concurrently or quasi-concurrently. Furthermore, routing is not necessary either, which is advantageous as it is possible to simplify implementation and reduce power consumption.

In a similar method, a time slot is allocated to each wireless communication node, which transmits data of this node using the flooding method within the time slot. A relay node that received the transmitted data relays the data in the time slot allocated thereto. In this method, the data transmitted from the transmission node is relayed such that the data ultimately reaches a data collection node by repeating the above process. (See Patent Literature 2)

CITATION LIST

Non-Patent Literature

NPL1: F. Ferrari et al., "Efficient Network Flooding and Time Synchronization with Glossy", IPSN'11, 2011

NPL2: Chao GAO et al., "Efficient Collection Using Constructive-Interference Flooding in Wireless Sensor Networks", The Institute of Electronics, Information and Communication Engineers Society Conference Proceedings, 2011_Communication (2), 428, 2011-08-30

NPL3: Makoto Suzuki, Tomonori Nagayama, Sotaro Ohara, Hiroyuki Morikawa, "Structural Monitoring Using Concurrent Transmission Flooding," The Institute of Electronics, Information and Communication Engineers Transactions B, No. 12, pp. 952-960, 2017

SUMMARY OF INVENTION

Technical Problem

In the field of wireless communications, channel hopping technology is known in which a frequency channel to be used for packet transmission is switched for the purpose of improving anti-interference performance. With the channel hopping technology, communication can continue even if a specific channel is occupied by another wireless system or the like, but the frequency channel to be used for packet transmission needs to be synchronized between the transmitting and receiving sides.

The present invention has been made in view of the foregoing problem, and aims to provide a technology advantageous for performing efficient communication in a wireless communication system that performs communication by means of channel hopping using a flooding method.

Solution to Problem

One aspect of the present invention provides a communication apparatus in a multi-hop relay system in which a packet is transmitted and received using a flooding method in a first flooding slot and a second flooding slot each including a plurality of sub-slots, the communication apparatus comprising: channel control unit configured to: switch a frequency channel to be used to transmit and receive a packet between a first sub-slot and a second sub-slot in the first flooding slot; and not switch the frequency channel to be used to transmit and receive a packet within the second flooding slot, but switching the frequency channel to be used to transmit and receive a packet between a plurality of the second flooding slots.

Another aspect of the present invention provides a communication method for a multi-hop relay system in which a packet is transmitted and received between nodes using a flooding method in a first flooding slot and a second flooding slot each including a plurality of sub-slots, the communication method comprising: switching a frequency channel to be used to transmit and receive a packet between a first sub-slot and a second sub-slot in the first flooding slot; and not switching the frequency channel to be used to transmit and receive a packet within the second flooding slot, but switching the frequency channel to be used to transmit and receive a packet between a plurality of the second flooding slots.

Still another aspect of the present invention provides a multi-hop relay system in which a packet is transmitted and received between nodes using a flooding method in a first flooding slot and a second flooding slot each including a plurality of sub-slots, the multi-hop relay system, wherein: a frequency channel to be used to transmit and receive a packet is switched between a first sub-slot and a second sub-slot in the first flooding slot; and the frequency channel to be used to transmit and receive a packet is not switched within the second flooding slot, but the frequency channel to be used to transmit and receive a packet is switched between a plurality of the second flooding slots.

Advantageous Effects of Invention

According to the present invention, it is possible to provide a technology advantageous for performing efficient communication in a wireless communication system that performs communication by means of channel hopping using a flooding method.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 2 is a functional block diagram of a transmission node according to one embodiment.

FIG. 3 is a functional block diagram of a relay node according to one embodiment.

FIG. 6 is a diagram showing an example structure of a packet transmitted and received in communication using the flooding method according to one embodiment.

FIG. 8 is a timing chart showing a structure of flooding slots for data packet transmission.

FIG. 9A is a diagram showing an example of a channel used in a flooding slot.

FIG. 9B is a diagram showing an example of a channel used in a flooding slot for synchronization packet transmission.

DESCRIPTION OF EMBODIMENTS

Figure 1:
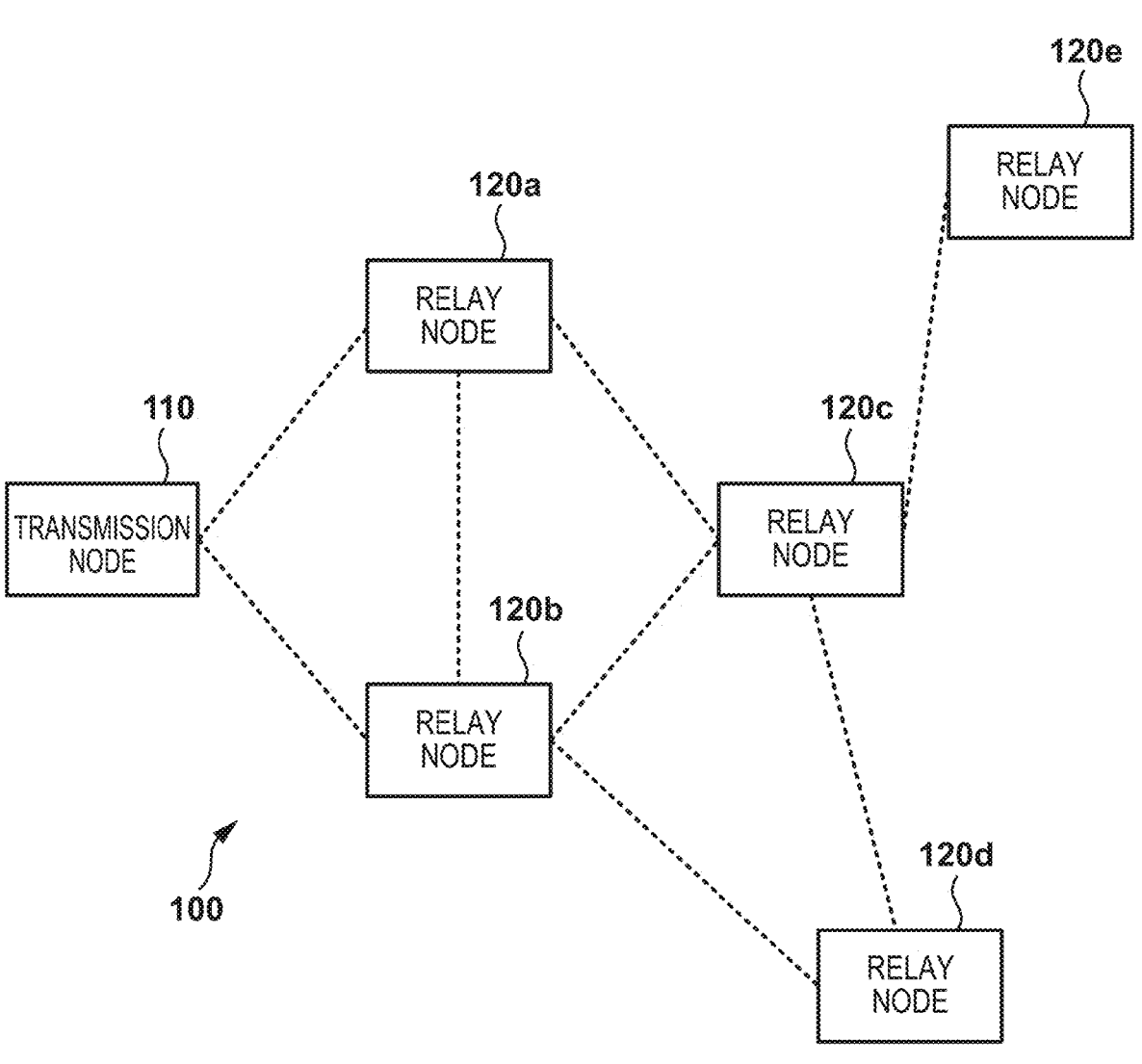
FIG. 1 is a diagram showing a configuration example of a wireless communication system according to one embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram showing a wireless communication system 100 (multi-hop relay system) according to the present embodiment.

The wireless communication system 100 includes a transmission node 110 and relay nodes 120*a* to 120*e* (which may also be referred to as "relay node(s) 120" without distinction). In the wireless communication system 100, the plurality of relay nodes 120 need to perform concurrent transmission, which requires synchronization between the nodes in the wireless communication system 100. To establish synchronization between the nodes, one transmission node 110 in the wireless communication system periodically sends a synchronization packet, and the relay nodes 120 that received the synchronization packet transfer the synchronization packet through communication using the flooding method, thereby transmitting the synchronization packet to all nodes in the wireless communication system 100.

Each of the nodes that received the synchronization packet calculates a time difference between the node and the transmission node 110 based on time information included in the synchronization packet and the number of times that the synchronization packet was transferred, and performs time synchronization. When a relay node is not time-synchronized, such as when a node is restarted, the relay node waits for the synchronization packet, receives the synchronization packet, synchronizes with the system clock, and thereafter joins the wireless communication system.

In the wireless communication system 100 according to the present embodiment, a node that wants to transmit a packet containing data such as sensor data is allocated permission to transmit data using an allocated flooding slot. The wireless communication node that was allocated the permission for transmission transmits the packet containing the sensor data or the like within the allocated flooding slot. Other nodes that received that packet immediately broadcast the same packet using the flooding method. This operation is repeated. To synchronize the communication system, the transmission node 110 transmits a synchronization packet for synchronizing the nodes using the flooding method in a flooding slot for synchronization. Each relay node 120 transfers the synchronization packet received from the transmission node 110 or other relay nodes 120 to flood the entire system with the synchronization packet, thereby causing the nodes to be synchronized. The "flooding slot" refers to one cycle of repeating broadcast transmission using the flooding method to transmit a packet from one wireless communication node to at least one other destination wireless communication node. Note that a time slot for each node to perform transmission or reception within the flooding slot is referred to as a "sub-slot". Note that the length of the sub-slot (sub-slot length) depends on, for example, the packet length transmitted by the transmission node, and may be different for each flooding slot.

Note that a description is given with reference to FIG. 1 taking, as an example, the wireless communication system 100 that includes one transmission node 110 and a plurality of the relay nodes 120, but the wireless communication system 100 may include a plurality of transmission nodes 110.

The transmission node 110 and the plurality of relay nodes 120 may play different roles for the flooding slot for time synchronization and for flooding slots for purposes other than synchronization. In the description of the present embodiment, the transmission node 110 operates as a sink node that collects a sensor data from the other nodes in a flooding slot for transmitting later-described sensor data. However, in another example, the transmission node 110 may alternatively operate as a relay node that relays a packet containing sensor data transmitted by the other nodes in the flooding slot for transmitting the later-described sensor data. That is, here, the transmission node 110 and the plurality of relay nodes 120 in FIG. 1 are examples to illustrate the flooding slot for time synchronization. In a flooding slot for another purpose, e.g. data transmission, each of the nodes may play a different role. Note that in the present embodiment, the nodes within the wireless communication system, including the transmission node 110, the relay nodes 120, and the sink node, are referred to as wireless communication nodes.

FIG. 2 is a block diagram showing a configuration of the aforementioned transmission node 110. The transmission node 110 includes a wireless communication unit 201, a communication control unit 202, a synchronization packet generation unit 203, and a data collection unit 204.

The wireless communication unit 201 is a module that operates as a wireless signal transmitter/receiver, and wirelessly transmits and receives data to and from the other relay nodes 120 via an antenna of the wireless communication unit 201 or an external antenna (not shown). The communication control unit 202 manages the communication status of the wireless communication unit 201 and causes transmission/transfer processing to be executed in accordance with a predetermined sequence. Note that the communication control unit 202 may also receive a packet from another wireless communication node, analyze the data from the other wireless communication node, and perform relay processing to broadcast the received packet in accordance with the flooding method.

The communication control unit 202 includes a channel determination unit 2021 that determines a frequency channel for transmitting the synchronization packet. Based on a pseudo-random function, the channel determination unit 2021 determines a channel for transmitting the synchronization packet for each of the plurality of sub-slots included in the flooding slot for transmitting synchronization packets. Also, the channel determination unit 2021 determines a channel for receiving a data packet for each flooding slot for transmitting data packets, based on a pseudo-random function. The details of the channel determination unit 2021 will be described later with reference to FIGS. 7 to 9B.

The synchronization packet generation unit 203 generates a synchronization packet in a predetermined time cycle and transmits the generated synchronization packet to the communication control unit 202. In an example, the synchronization packet generation unit 203 includes a clock unit, such as a crystal oscillator, in order to generate a highly accurate clock signal.

Note that the transmission node 110 may also include a processor, and the processor may load a program stored in a storage to a memory and execute the loaded program to realize at least one of the functions of the wireless communication unit 201, the communication control unit 202, and the synchronization packet generation unit 203.

The data collection unit 204 realizes its function as a sink node that collects sensor data from any of the wireless communication nodes. The data collection unit 204 is provided in the transmission node 110 since the transmission node 110 functions as a sink node in the present embodiment, as mentioned above. On the other hand, the transmission node 110 need not necessarily function as a sink node, and in that case, the data collection unit 204 may be provided in another wireless communication node.

FIG. 3 is a block diagram showing a configuration of the aforementioned relay node 120. The relay node 120 includes a wireless communication unit 301, a communication control unit 302, a time synchronization unit 303, and a data generation unit 304.

The wireless communication unit 301 of the relay node 120 has the same functions as the wireless communication unit 201 of the transmission node 110, and a description thereof is omitted.

The communication control unit 302 includes a channel determination unit 3021 that determines a frequency channel for receiving and transferring (relaying) the synchronization packet. Based on a pseudo-random function, the channel determination unit 3021 determines a channel for transmitting the synchronization packet for each of the plurality of sub-slots included in the flooding slot for receiving and transferring the synchronization packet. Also, the channel determination unit 3021 determines a channel for receiving a data packet for each flooding slot for transmitting or relaying the data packet, based on a pseudo-random function. The details of the channel determination unit 3021 will be described later with reference to FIGS. 7 to 9B.

The time synchronization unit 303 corrects a clock of the relay node 120 based on the synchronization packet received via the wireless communication unit 301.

The data generation unit 304 generates data to be collected by the sink node. If the relay node 120 is a sensor node that transmits data acquired from a sensor, the data generation unit 304 may be a sensor, or may be an interface connected to a sensor outside the relay node 120. Note that the relay node 120 may optionally have a configuration similar to the transmission node 110. That is, the relay node 120 may additionally have a configuration corresponding to the synchronization packet generation unit 203.

Note that the relay node 120 may also include a processor, and the processor may load a program stored in a storage to a memory and execute the loaded program to realize at least one of the functions of the wireless communication unit 301, the communication control unit 302, the time synchronization unit 303, and the data generation unit 304.

Here, an example of a format of the synchronization packet transmitted by the transmission node 110 is described with reference to FIG. 6.

Transmission source information 601 is information indicating an identifier of the transmission node 110. Destination information 602 is information indicating a destination of the packet. In the time synchronization packet, the destination information 602 is set as an identifier indicating broadcast or anycast. Time information 603 is time information corresponding to the time when the synchronization packet generation unit 203 of the transmission node 110 generates the synchronization packet, or the time when the wireless communication unit 201 of the transmission node 110 transmits the synchronization packet. The time information 603 is also referred to as time stamp information. Timing information 604 is information corresponding to a sub-slot in which the synchronization packet is transmitted, and is changed each time the synchronization packet is transferred in the flooding method. In one example, the relay node 120 that received the synchronization packet performs processing to transfer the synchronization packet by reconfiguring the packet by updating the timing information 604, and transmitting the reconfigured packet in the next sub-slot.

Note that, in one example, the destination information 602 may be notified in an upper layer, or may be notified by using schedule information created at the time of slot allocation. In this case, the destination information 602 may be included in a packet payload without being included in the header of the synchronization packet.

Flooding slot setting information 606 is a parameter for enabling the relay node 120 that received the synchronization packet to acquire parameters of the flooding slot or the sub-slot. The flooding slot setting information 606 includes the time length of the flooding slot, the time length of the sub-slot, the transmission cycle of the synchronization packet, the maximum number of times of transmission within the flooding slot, and the number of packet losses of the synchronization packet that is allowed before synchronization recovery processing is executed.

Figure 4:
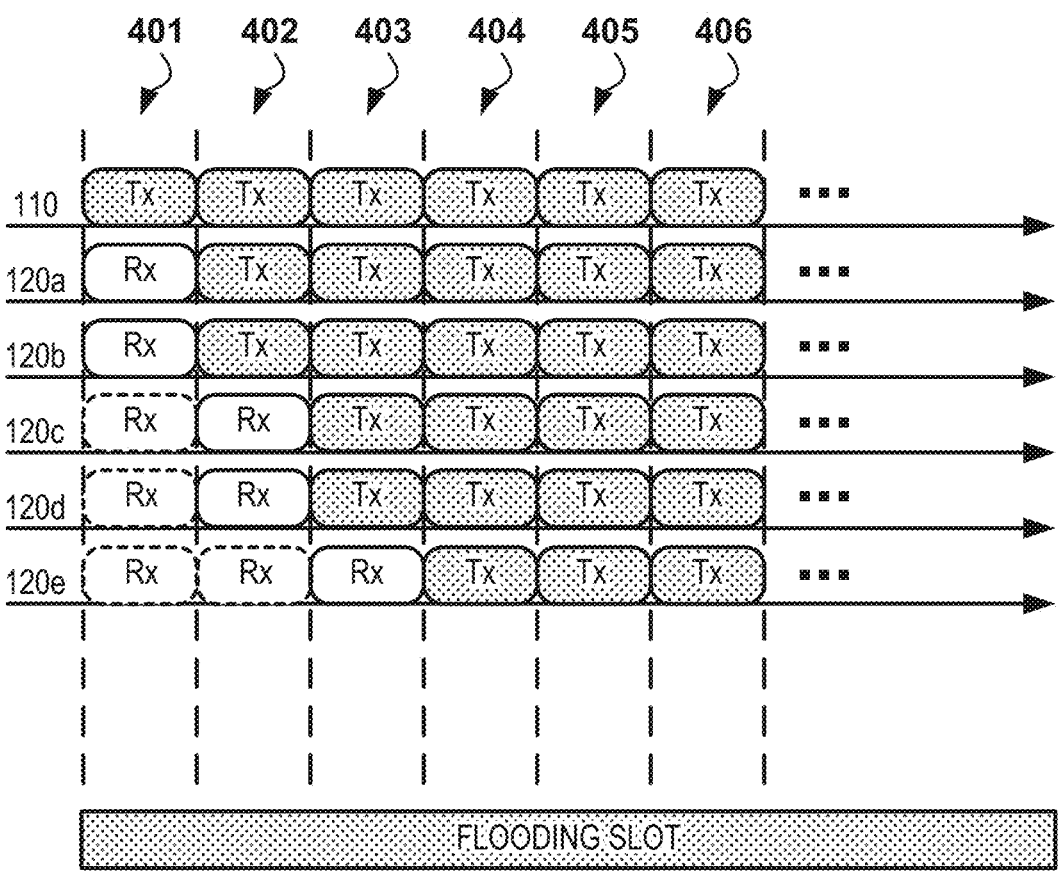
FIG. 4 is a timing chart of sub-slots in communication using a flooding method according to one embodiment.

Next, a description is given, with reference to FIG. 4, of an example of data transmission using the flooding method performed by the wireless communication system having the configuration in FIG. 1. FIG. 4 illustrates the case where the transmission node 110 transmits the synchronization packet. In this example, it is assumed that the nodes have already been synchronized.

FIG. 4 shows an example of use of the sub-slots by each of the wireless communication nodes in the wireless system shown in FIG. 1. In the following description of the flooding method shown in FIG. 4, when each node in the wireless system receives a packet in one sub-slot, the node repeats transmission based on the received packet in the subsequent sub-slots. However, an upper limit may be determined for the number of times of packet transmission. Alternatively, each node may receive a packet again in the next sub-slot after transmitting a packet once, and transmit a packet when receiving this packet.

Initially, in a first sub-slot 401, the transmission node 110 transmits the synchronization packet. It is assumed that the synchronization packet from the transmission node 110 are received by the relay nodes 120a and 120b.

For example, in the sub-slot 401, the transmission node 110 sets information with the timing information 604 indicating "1" and transmits the synchronization packet. The synchronization packet transmitted from the transmission node 110 is received by the relay nodes 120a and 120b.

In a first sub-slot 402 following the sub-slot 401, the transmission node 110 and the relay nodes 120a and 120b transfer the received synchronization packet. The synchronization packets transmitted by a plurality of wireless communication nodes in one sub-slot contain the same data, and the transmission time is synchronized. Thus, those synchronization packets can be decoded without problem even if there is a collision therebetween. Thus, the relay nodes 120c and 120d each receive two synchronization packets concurrently transmitted from the relay nodes 120a and 120b as one synchronization packet. Here, the transmission node 110 and the relay nodes 120a and 120b increase the timing information 604 to "2" and transmit the synchronization packet. It is assumed that the synchronization packets from the relay nodes 120a and 120b are received by the transmission node 110 and the relay nodes 120c and 120d.

Subsequently, in a sub-slot 403 following the sub-slot 402, the transmission node 110 and the relay nodes 120a and 120b, as well as the relay nodes 120c and 120d that received the synchronization packet in the sub-slot 402 set the timing information 604 to "3" and transfer the received synchronization packet. It is assumed that the synchronization packets from the transmission node 110 and the relay nodes 120a to 120d are received by the relay node 120e.

Subsequently, in a sub-slot 404 following the sub-slot 403, the transmission node 110 and the relay nodes 120a to 120d, as well as the relay node 120e that received the synchronization packet in the sub-slot 403 set the timing information 604 to "4" and transfer the received synchronization packet.

In the subsequent sub-slots 405 and 406 as well, the synchronization packet can be transmitted to the nodes in the network by each node transmitting and receiving the synchronization packet in the same manner as in the sub-slot 404.

Note that, in this example, the relay nodes 120c to 120e are also waiting for the synchronization packet in the sub-slot 401. However, the relay nodes 120c to 120e cannot detect the synchronization packet transmitted from the transmission node 110 in the sub-slot 401, and therefore continue to wait for the synchronization packet in the subsequent sub-slot 402. That is, the relay nodes 120a to 120e perform wait processing to receive the synchronization packet after the start of the flooding slot, as indicated by dotted lines.

The relay nodes 120 performs time synchronization immediately after receiving the synchronization packet. For this reason, the packet length of the synchronization packet is the same as the sub-slot length in the example in FIG. 4. However, the packet length of the synchronization packet may be shorter than the sub-slot length, and overhead may be provided after transmission and reception of the synchronization packet within each sub-slot.

Next, an example of processing executed by the wireless communication system according to the present embodiment is described with reference to FIG. 5.

Figure 5:
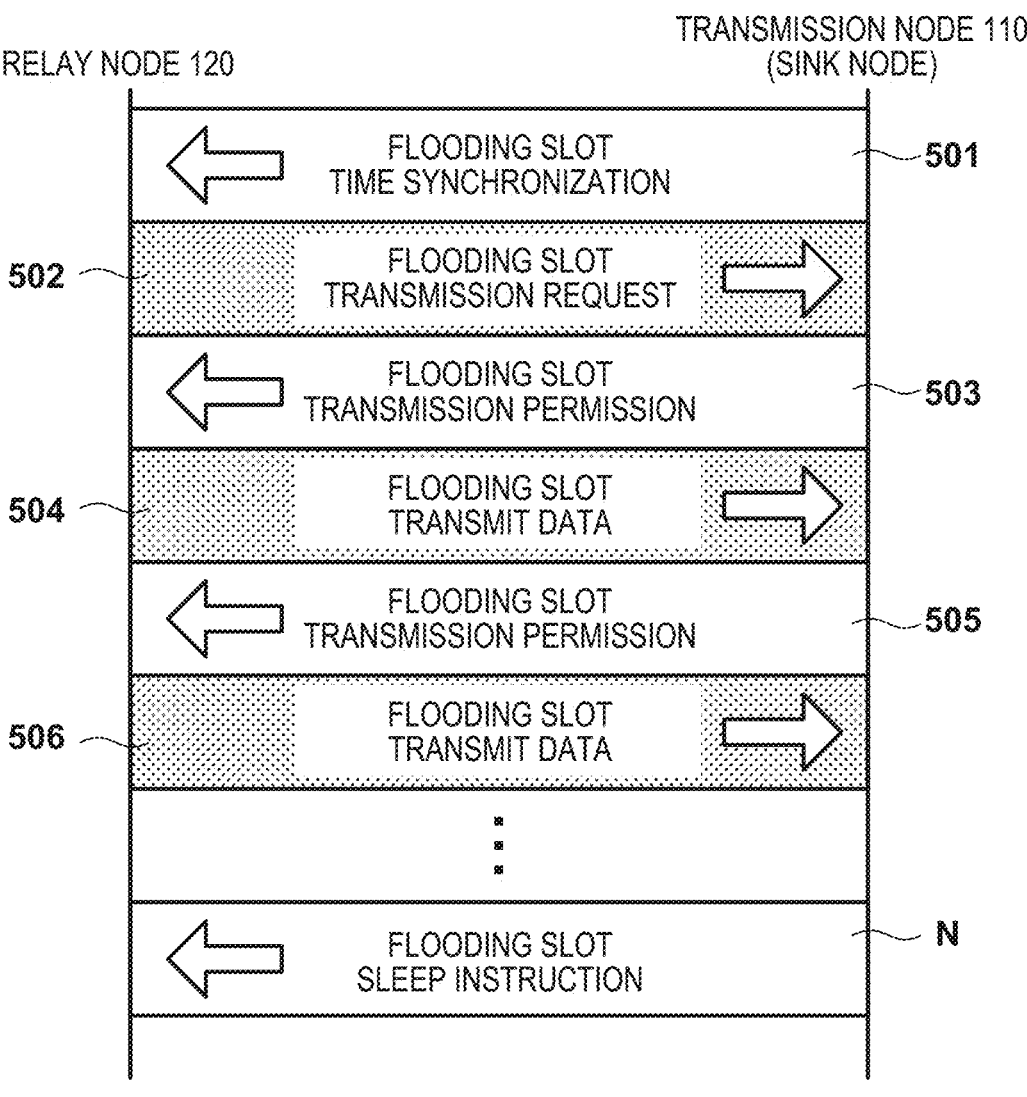
FIG. 5 is a sequence chart of flooding slots in communication using the flooding method according to one embodiment.

FIG. 5 is a sequence chart of processing in which the transmission node 110 causes time synchronization to be executed within the wireless communication system, and collects data from any of the relay nodes 120. Not that in the description given with reference to FIG. 5, the transmission node 110 is a sink node that collects data from the relay nodes 120, but the wireless communication system 100 may alternatively include a sink node separate from the transmission node 110.

Each flooding slot represents a time period of data transfer by means of flooding. One flooding slot represents a time period allocated to transmission (downlink) from one of the communication nodes including the transmission node 110 and the relay nodes 120 to a destination that is at least one node out of the other communication nodes, or transmission (uplink) from at least one wireless communication node out of the other communication nodes to the transmission node 110.

Note that communication using the flooding method such as that described with reference to FIG. 4 is used in both uplink and downlink transmission.

First, a flooding slot 501 is a flooding slot for the transmission node 110 to transmit the synchronization packet and notify the communication nodes in the wireless communication system of information necessary for time synchronization in accordance with the flooding method.

Subsequently, in a flooding slot 502, each relay node 120 that has data to be transmitted to the transmission node 110 transmits a transmission request packet to make a request to transmit the data to be transmitted, to the destination that is the transmission node 110.

In one example, in the flooding slot 502, communication in a random backoff-based flooding method is performed in which at least one relay node 120 that has the data to be transmitted waits for a random time generated using a pseudo-random function and transmits the transmission request packet (transmission request signal). In this case, a relay node 120 that has the data to be transmitted and that received, before transmitting the transmission request packet, a transmission request packet from another relay node 120 relays the transmission request packet from the other relay node 120 and does not transmit its own transmission request packet. Thus, the relay node 120 with a short random time generated using the pseudo-random function can transmit a transmission request packet. In this manner, in the flooding slot 502, the transmission node 110 can recognize the node that is to be permitted to transmit data.

Subsequently, in a flooding slot 503, the transmission node 110 sets the relay node 120 to be permitted to transmit data in the next flooding slot 504 as the destination information 602, and transmits a transmission permission packet.

Subsequently, in the flooding slot 504, the relay node 120 designated by the transmission permission packet starts transmission in this slot. That is, the relay node 120 sets the identifier thereof as the transmission source information 601, also sets the transmission node 110 as the destination information 602, and transmits sensor data.

Subsequently, the transmission node 110 that has determined that the sensor data has been successfully received in the flooding slot 504 also transmits transmission permission to the other relay nodes 120 in a flooding slot 505. In one example, from a flooding slot 506 onward, uplink transmission of sensor data is performed as many times as the number of flooding slots corresponding to the number of relay nodes 120 permitted to transmit the sensor data by the transmission node 110. Thereafter, if, in a flooding slot N, the transmission node 110 determines that data collection from all relay nodes 120 has been completed, the transmission node 110 transmits a sleep packet (sleep signal) for giving a sleep instruction. The wireless communication nodes that received the sleep packet in the wireless communication system transition to a sleep state until a predetermined time after the flooding slot N ends. The predetermined time may be a preset time common among the wireless communication nodes, such as 1000 milliseconds, or may be specified based on information included in the sleep packet.

Channel Control

For the purpose of increasing resistance to interference from other wireless devices, there is channel hopping technology, in which transmission and reception is performed while changing a frequency channel (hereinafter referred to as a "channel") for transmitting packets such as a synchronization packet and data packet. With the channel hopping technology, even in a state where specific frequency noise is occurring, resistance to interference can be increased by performing communication using a frequency other than the noise frequency. Meanwhile, a receiving node cannot receive a packet unless the node identifies which channel is to be used to transmit the packet, at which timing. Therefore, when applying the channel hopping technology, it is necessary that the channel to be used for transmitting packets is synchronized between transmission and reception.

The following issues arise when considering the application of the channel hopping technology to the wireless communication system 100.

When a relay node 120 is started and joins the wireless communication system 100, the relay node 120 is not time-synchronized and therefore cannot identify at which timing and with which frequency the synchronization packet is to be transmitted. Thus, the relay node 120 needs to remain in a listen state, waiting for a time synchronization packet on one frequency until the relay node 120 is time-synchronized.

If a relay node 120 is waiting for a data packet in a flooding slot for data transmission, the relay node 120 does not recognize the network topology and therefore cannot identify the number of hops from a relay node transmitting the data packet to the relay node 120 waiting for the data packet. In addition, in a flooding slot for data transmission, there are cases where data transmission is performed with a variable packet length, i.e. a variable data packet size. Thus, the relay node 120 cannot identify at which timing and over which frequency channel the data packet to be relayed is transmitted.

Channel control according to the present embodiment is described while considering the above issues.

Figure 7:
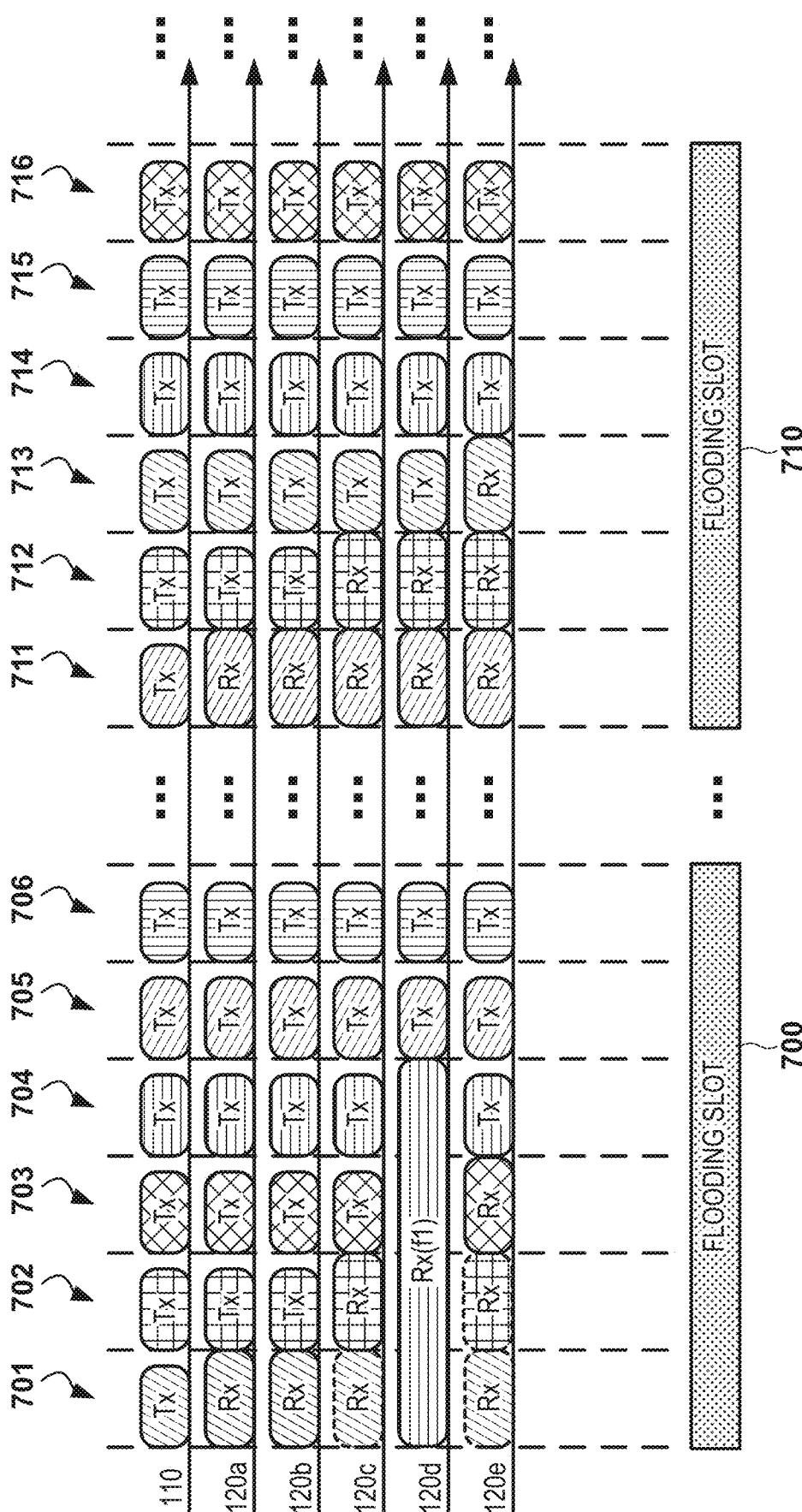
FIG. 7 is a timing chart showing a structure of flooding slots for synchronization packet transmission.

A description is given, with reference to FIG. 7, of transmission and reception of the synchronization packet in flooding slots 700 and 710 (e.g. flooding slot 501 in FIG. 5) for time synchronization. Note that in the example in FIG. 7, the relay node 120d is not time-synchronized due to the node having been restarted, and is waiting for the synchronization packet on a specific channel, e.g. f1. The channel on which the relay node 120d, which is not time-synchronized, waits for the synchronization packet may be set for each system, or the relay node 120d may wait on a channel with the smallest channel number. In the example in FIG. 7, the relay nodes 120a, 120b, 120c, and 120e have previously received the synchronization packet and determined the transmission timing and the channel for the synchronization packet transmitted from the transmission node 110 by means of channel hopping using channels f1 to f6.

Initially, in a first sub-slot 701 of the flooding slot 700, the transmission node 110 transmits the synchronization packet over a channel (e.g. channel f2) that is different from the channel f1. Since the relay nodes 120a and 120b are synchronized with the transmission node 110, these relay nodes receive the synchronization packet transmitted from the transmission node 110. As shown in FIG. 7, the relay nodes 120c and 120e have also determined the channel over which the transmission node 110 transmits the synchronization packet thereto, and thus wait, in the sub-slot 701, for the synchronization packet on the channel over which the synchronization packet is to be transmitted. The relay node 120d cannot receive the synchronization packet since the relay node 120d is waiting in the sub-slot 701 on a channel that is different from the channel over which the synchronization packet is transmitted.

Note that in the present embodiment, the packet length of the synchronization packet is shorter than the length of the sub-slot 701. This is due to the overhead for changing the channel for transmission and reception, and the synchronization packet may also be waited for, for a period shorter than the length of the sub-slot during reception. Further, in one example, the relay nodes 120 may end the wait immediately after detecting the synchronization packet during the wait.

In the subsequent, second sub-slot 702, the transmission node 110 and the relay nodes 120a and 120b transmit the synchronization packet over a channel (e.g. channel f4) different from the channel f1, and the relay node 120c receives the synchronization packet. In this example, in the sub-slot 702, the synchronization packet is transmitted over a channel (f4) that is different from the channel (f2) over which the synchronization packet was transmitted in the sub-slot 701, as shown in FIG. 7. Meanwhile, in the sub-slot 702, the relay node 120d is waiting for the synchronization packet on the channel f1, which is different from the channel over which the synchronization packet is transmitted, and therefore cannot receive the synchronization packet.

In the subsequent, third sub-slot 703, the transmission node 110 and the relay nodes 120a, 120b, and 120c transmit the synchronization packet over a channel (e.g. channel f6) that is different from the channel f1, and the relay node 120e receives the synchronization packet. In the example in FIG. 7, in the sub-slot 703, the synchronization packet is transmitted over a channel (f6) that is different from the channels (channels f2 and f4) over which the synchronization packet was transmitted in the sub-slots 701 and 702. Meanwhile, in the sub-slot 703, the relay node 120d is waiting for the synchronization packet on the channel f1, which is different from the channel over which the synchronization packet is transmitted, and therefore cannot receive the synchronization packet.

In the subsequent, fourth sub-slot 704, the transmission node 110 and the relay nodes 120a, 120b, 120c, and 120e transmit the synchronization packet over the channel f1, and the relay node 120d receives the synchronization packet.

The relay node 120*d* can perform time synchronization based on the time information 603 and the timing information 604 included in the synchronization packet, and join the wireless communication system 100. The relay node 120*d* can also identify the channel to be used to transmit the synchronization packet in the next the sub-slot 705 based on at least either the time information 603 or the sequence number information 605, as well as the timing information 604, and the channel number on which the relay node 120*d* has been waiting. Determination of the channel to be used to transmit and receive the synchronization packet will be described later.

Subsequently, in the fifth and sixth sub-slots 705 and 706, the transmission node 110 and the relay nodes 120*a*, 120*b*, 120*c*, 120*d*, and 120*e* transmit the synchronization packet over the channel f5 in the fifth sub-slot 705, and over the channel f3 in the sixth sub-slot 706. That is, the relay node 120*d* is synchronized and joins subsequent packet transfer upon joining the wireless communication system 100. The nodes can be synchronized in the flooding slot 700 in the above-described manner.

After the flooding slot 700, a flooding slot (not shown) for transmitting data packets or the like is provided before the flooding slot 710 for the next time synchronization. In one example, in the wireless communication system 100, a flooding slot for time synchronization is provided at predetermined time intervals (e.g. every 60 seconds).

In a first sub-slot 711 of the flooding slot 710 following the flooding slot 700, the transmission node 110 transmits the synchronization packet over the channel f5, for example, and the relay nodes 120*a* and 120*b* receive the synchronization packet. Although the relay nodes 120*c*, 120*d*, and 120*e* cannot receive the synchronization packet, these relay notes determine the channel to be used to transmit the synchronization packet and wait for the synchronization packet on the channel f5. Subsequently, in a second sub-slot 711 of the flooding slot 710, the transmission node 110 and the relay nodes 120*a* and 120*b* transmit the synchronization packet over the channel f4, and the relay nodes 120*c* and 120*d* receive the synchronization packet. Thereafter, the synchronization packet is similarly transferred while switching the channel such that each node in the wireless communication system 100 receives the synchronization packet.

Here, although the relay node 120*d* received the synchronization packet in the fourth sub-slot 704 in the flooding slot 700, the relay node 120*d* receives the synchronization packet in the second sub-slot 712 in the flooding slot 710. Thus, the relay node 120*d* transmits the synchronization packet in a third sub-slot 713 in the flooding slot 710.

Note that the number of the sub-slot in which the relay nodes 120 can receive the synchronization packet may change due to dynamic changes in the topology of the wireless communication system 100, interference signals that vary over time, a frequency-selective propagation channel, or the like. Therefore, if a relay node 120 in the present embodiment loses synchronized, this relay node 120 continues to wait until the synchronization packet is received.

As described above, high anti-interference performance can be achieved by switching the channel for transmitting the synchronization packet between the plurality of sub-slots within each flooding slot.

Note that the synchronization packet according to the present embodiment is a fixed-length packet. Thus, the wireless communication nodes can determine the start time of each sub-slot.

In the above description given with reference to FIG. 7, it is assumed that a time-synchronized relay node 120 waits for the synchronization packet in all sub-slots. However, the relay node 120 may determine the number of the sub-slot to start waiting for the synchronization packet, based on information regarding the timing at which the synchronization packet was received in the past flooding slot for time synchronization. For example, based on receiving the synchronization packet in the third sub-slot 703 of the flooding slot 700, the relay node 120*e* may wait for the synchronization packet from the third sub-slot 713 in the flooding slot 710, and need not wait for the synchronization packet in the sub-slots 711 and 712. This can reduce power consumption associated with the relay node 120 waiting for the synchronization packet.

Figure 8:
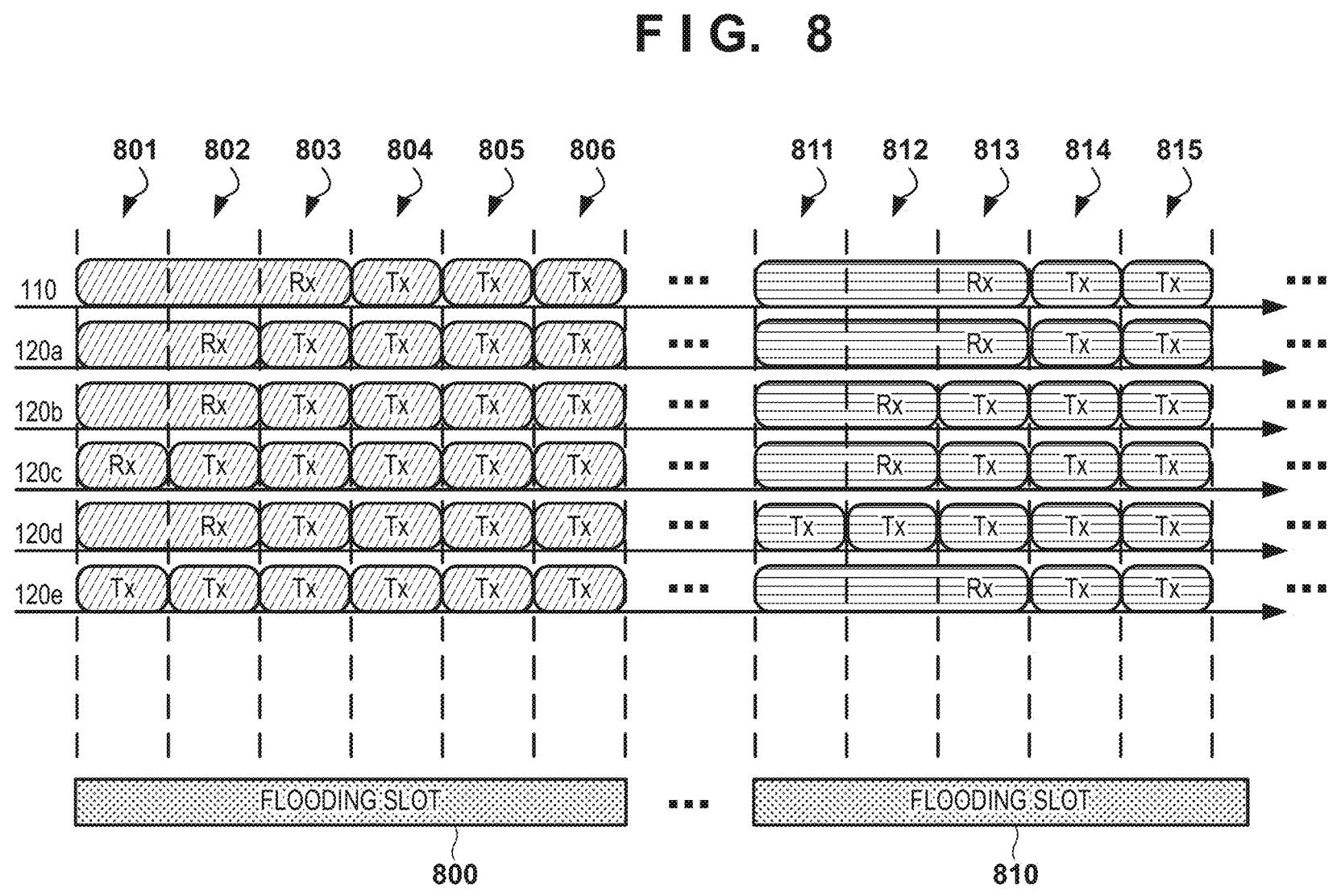

Next, a description is given, with reference to FIG. 8, of transmission and reception of data packets in flooding slots 800 and 810 for transmitting data packets. Note that in the example in FIG. 8, the transmission node 110 and the relay nodes 120 are time-synchronized. Further, in the following description, it is assumed that, the relay node 120*e* transmits a data packet to the transmission node 110 in the flooding slot 800, and the relay node 120*d* transmits a data packet to the transmission node 110 in the flooding slot 810. Also, in the description of the present embodiment, the transmission node 110 functions as a sink node.

In the flooding slot 800, data is transmitted using a predetermined channel (e.g. channel f2). In the subsequent flooding slot 810, data is transmitted using a channel (e.g. channel f1) that is different from the channel used in the flooding slot 800.

In a first sub-slot 801 of the flooding slot 800, the relay node 120*e* transmits a data packet containing sensor data or the like to the transmission node 110, and the relay node 120*c* receives the data packet. Subsequently, in a second sub-slot 802, the relay nodes 120*e* and 120*c* transmit the data packet over the same channel as the channel used to transmit the data packet in the sub-slot 801, and the relay nodes 120*a*, 120*b*, and 120*d* receive the data packet.

Note that, as shown in FIG. 8, the data packet is transmitted using the same channel in the sub-slots 801 and 802, and thus, the relay nodes 120 continue to wait for the data packet over a plurality of sub-slots until the relay nodes 120 receive the data packet.

Also, in FIG. 8, the sub-slot length is the same as the packet length since the channel used to transmit the data packet need not be switched between the sub-slots 801 and 802, but overhead may also be provided as appropriate for the purpose of updating the data packet or switching a wireless transmitting/receiving circuit, for example.

Thereafter, in a third sub-slot 803, the relay nodes 120*a*, 120*b*, 120*c*, 120*d*, and 120*e* transmit the data packet, and the transmission node 110 receives the data packet. Thereafter, in sub-slots 804, 805, and 806, the data packet is transmitted, and the flooding slot 800 ends. Note that the transmission node 110, which is a sink node, only receives the data packet, and need transmit the data packet.

In a first sub-slot 811 of the flooding slot 810 for data transmission following the flooding slot 800, the relay node 120*d* transmits a data packet containing sensor data or the like to the transmission node 110. Here, it is assumed that the relay nodes 120*b* and 120*c* fail in reception. Thus, the relay node 120*d* transmits the data packet also in a second sub-slot 812. In the sub-slot 812, the relay nodes 120*b* and 120*c* receive the data packet.

In the subsequent, third sub-slot 813, the relay nodes 120*b*, 120*c*, and 120*d* transmit the data packet, and the transmission node 110 and the relay nodes 120*a* and 120*e* receive the data packet. Thereafter, in sub-slots 814 and 815, the transmission node 110 and the relay nodes 120*a*, 120*b*, 120*c*, 120*d*, and 120*e* transmit the data packet.

Note that in each flooding slot for data transmission according to the present embodiment, data packets of different packet lengths are transmitted between the plurality of flooding slots 800 and 810 for data transmission, as shown in FIG. 8. Further, the relay nodes 120, which relay the data packet, is not notified, in advance, of information regarding the packet length of the data packet to be transmitted in the flooding slot for data transmission. Thus, a relay node 120 that has not received the data packet cannot identify the slot length of each sub-slot.

However, the channel to be used to transmit the data packet is not switched within the flooding slot for data transmission. Therefore, the relay node 120 can realize transmission of a variable-length data packet by continuing to attempt to detect packets on the channel, even if the relay node 120 does not have the information regarding the packet length.

In the wireless communication system 100 according to the present embodiment, the relay nodes 120 do not recognize the network topology. Thus, the relay nodes 120 do not recognize the number of hops from a node transmitting a data packet in the flooding slot for data transmission. In this case, even if the number of hops from the node transmitting the data packet is unknown, the relay nodes 120 can receive the data packet by waiting for the data packet on the channel used in the flooding slot.

Further, since the channel is not switched within one flooding slot for data transmission, a guard time for switching the channel need not be provided between data packets, thus enabling a reduction in overhead within the flooding slot for data transmission.

In the plurality of flooding slots for data transmission, data is transmitted using different channels. This can increase anti-interference performance in the flooding slots for data transmission.

Method for Determining Channel

Next, a description is given of a method for determining channels over which the transmission node 110 and a relay node 120 that is time-synchronized with the transmission node transmit the synchronization packet and the data packet.

In the wireless communication system 100 according to the present embodiment, a transmission channel is determined for each flooding slot, using a channel corresponding to a pseudo-random number synchronized between the nodes. Here, an example is described in which a data packet is transmitted using a channel corresponding to a pseudo-random number obtained with the linear congruential method $$X_{n+1}=(A \times X_n + B) \bmod M$$

Here, $X_n$ is a pseudo-random number value. $X_n(X_0)$ when n=0 is a constant called a seed. M is a total number of channels used in the network, and A and B are constants determined depending on M. In one example, numbers are chosen as A and B such that B is coprime to M and A−1 is divisible by all prime factors of M.

For example, each relay node 120 acquires the identifier of the wireless network and the identifier of the transmission node 110 or the sink node as prior information regarding the wireless communication system 100 that the relay node 120 is to join, when the device is produced or firmware is written.

With this prior information as a seed, $X_0$ is identified, the constants A and B are identified, and a number sequence of pseudo-random numbers is generated. Then, the channel corresponding to each flooding slot can be identified from a sequence number n included in the synchronization packet.

Here, the relationship of the channel between the flooding slots is described with reference to FIGS. 9A and 9B. FIG. 9A shows flooding slots 900, 901, 904 to 909, 912, and 913 for data transmission, flooding slots 903 and 911 for control signal transmission, and flooding slots 902 and 910 for synchronization signal transmission. It is assumed that that the sequence number of the flooding slot 900 is k, and the channel number used for transmission is $X_k$. FIG. 9B shows sub-slots 920 to 925 included in the flooding slot 902.

As shown in FIG. 9B, the synchronization packet is transmitted while switching the channel, as mentioned above, in the sub-slots 920 to 925 of the flooding slot for synchronization signal transmission. Note that $Y_0=X_{k+2}$ in the example in FIG. 9B.

In the present embodiment, in the flooding slot for synchronous signal transmission, the channel is switched, sub-slot by sub-slot within the flooding slot, in synchronization between the nodes. For example, the synchronization packet may be transmitted while switching the channel for each sub-slot, using a channel corresponding to a pseudo-random number obtained with the linear congruential method, as mentioned above.

$$Y_{n+1}=(C \times Y_n + D) \bmod S$$

Here, $Y_n$ is a pseudo-random number value, and $Y_n(Y_0)$ when n=0 is a constant called a seed. S is a total number of sub-slots included in the flooding slot for synchronization signal transmission, and C and D are constants determined depending on S. In one example, numbers are chosen as C and D such that D is coprime to S and C−1 is divisible by all prime factors of S.

That is, $Y_n$ may be determined such that a pseudo-random number is generated using a pseudo-random function different from the pseudo-random function used to identify the channel number for each flooding slot, and the channel used is switched for each sub-slot.

Alternatively, the channel may be switched based on a predetermined rule, such as increasing the channel number as $Y_{n+1}=(Y_n+1) \bmod M$. Alternatively, $Y_n$ may be determined as follows, using a pseudo-random function for identifying the channel number for each flooding slot.

$$Y_{n+1}=(A \times Y_n + B) \bmod M$$

For example, it is assumed that a relay node 120 that is not time-synchronized waits for the synchronization packet, and resultantly receives the synchronization packet in the sub-slot 923 shown in FIG. 9B.

In this case, the relay node 120 that received the synchronization packet identifies $X_0$ by using the prior information as a seed, and generates number sequences up to $X_{k+2}$ based on the sequence number information 605 included in the synchronization packet, thereby identifying an initial channel $Y_0$ in the flooding slot 902. Subsequently, the channel to be used to transmit the synchronization packet in the sub-slot 924 following the sub-slot 923 can be identified based on the initial the channel $Y_0$, as mentioned above.

Therefore, the relay node 120 that is not time-synchronized can join the transfer of the synchronization packet by performing time synchronization after receiving the synchronization packet.

Subsequently, since the relay node 120 has identified $X_{k+2}$, the relay node 120 can join the transmission of control packets and data packets in the flooding slot k+3 onward by generating pseudo-random numbers using the pseudo-random function.

As described above, anti-interference performance can be improved by switching between the frequency channels $X_k$ to $X_{k+13}$ used for packet transmission in each flooding slot, as shown in FIG. 9A.

In addition, generating the frequency channel used for packet transmission in each flooding slot using the pseudo-random function makes it possible to prevent the channel used by a plurality of wireless communication systems 100 from continuing to overlap and causing continuous communication failures.

Other Embodiments

The invention is not limited to the foregoing embodiments, and various variations/changes are possible within the spirit of the invention.

For example, in the above description given with reference to FIGS. 7 and 9B, it is assumed that the channel used to transmit and receive the synchronization packet is switched for every other sub-slot in the flooding slot for synchronization packet transmission. However, transmission may be performed using the same channel in a predetermined number of consecutive sub-slots, e.g., two or three consecutive sub-slots. That is, in the flooding slot for synchronization packet transmission, the channel need only be switched within the slot, and the channel need not be switched for each sub-slot.

In the present embodiment, the flooding slot for synchronization packet transmission is illustrated as including six sub-slots. However, the number of sub-slots included in the flooding slot can be set optionally by changing the flooding slot length, the packet length of the synchronization packet, or the guard time within a sub-slot. In one example, the number of sub-slots is greater than or equal to the number of channels that the wireless communication system 100 can use. This allows the synchronization packet to be transmitted over all channels that the wireless communication system 100 can use in one flooding slot for synchronization packet transmission, and can increase the probability that the relay nodes 120 that are not time-synchronized and waiting for the synchronization packet on one channel will receive the synchronization packet. In one example, the number of channels that the wireless communication system 100 can use is 16, and the number of sub-slots included in each flooding slot for synchronization packet transmission is 16.

In the above description of the present embodiment, it is assumed that variable-length packets are transmitted in the flooding slot for data packet transmission. However, fixed-length packets may alternatively be transmitted.

REFERENCE SIGNS LIST

100: Wireless communication system, 110: Transmission node, 120: Relay node

What is claimed is:

1. A communication apparatus in a multi-hop relay system in which a packet is transmitted and received using a flooding method in a first flooding slot and a second flooding slot each including a plurality of sub-slots, the communication apparatus comprising:

channel control unit configured to:

switch a frequency channel to be used to transmit and receive a fixed- length packet, which is a synchronization packet, between a first sub-slot and a second sub-slot in the first flooding slot; and not switch the frequency channel to be used to transmit and receive a variable-length packet, which is a data packet, within the second flooding slot, but switching the frequency channel to be used to transmit and receive a variable-length packet between a plurality of the second flooding slots.

2. The communication apparatus according to claim 1, wherein the channel control unit switches the frequency channel in accordance with a first hopping pattern for each sub-slot in the first flooding slot.

3. The communication apparatus according to claim 2, wherein the first hopping pattern is determined based on a pseudo-random number that is synchronized between nodes.

4. The communication apparatus according to claim 1, wherein the channel control unit switches the frequency channel to be used to transmit and receive a packet in accordance with a second hopping pattern for each of the plurality of second flooding slots.

5. The communication apparatus according to claim 4, further comprising:

identifying unit configured to identify the second hopping pattern based on a parameter of a packet received in the first flooding slot.

6. The communication apparatus according to claim 4, wherein the second hopping pattern is determined based on a pseudo-random number that is synchronized between nodes.

7. The communication apparatus according to claim 1, wherein a fixed-length packet is transmitted and received in the first flooding slot.

8. The communication apparatus according to claim 1, further comprising:

transmitting unit configured to transmit sensor data acquired from a sensor in a leading sub-slot of each of the second flooding slots.

9. The communication apparatus according to claim 1, wherein the synchronization packet containing time stamp information is transmitted and received in the first flooding slot.

10. The communication apparatus according to claim 1, wherein if a packet is received in the first sub-slot in the first flooding slot, the channel control unit identifies the frequency channel to be used to transmit and receive a packet in the second sub-slot, and the communication apparatus further comprises transfer unit configured to transfer, in the second sub-slot, the packet received in the first sub-slot.

11. A communication method for a multi-hop relay system in which a packet is transmitted and received between nodes using a flooding method in a first flooding slot and a second flooding slot each including a plurality of sub-slots, the communication method comprising:

switching a frequency channel to be used to transmit and receive a fixed-length packet, which is a synchronization packet, between a first sub-slot and a second sub-slot in the first flooding slot; and not switching the frequency channel to be used to transmit and receive a variable-length packet, which is a data packet, within the second flooding slot, but switching the frequency channel to be used to transmit and receive a variable-length packet between a plurality of the second flooding slots.

12. A multi-hop relay system in which a packet is transmitted and received between nodes using a flooding method in a first flooding slot and a second flooding slot each including a plurality of sub-slots, the multi-hop relay system comprising a communication apparatus in a multi-hop relay system comprising: channel control unit configured to:

switch a frequency channel to be used to transmit and receive a fixed- length packet, which is a synchronization packet, between a first sub-slot and a second sub-slot in the first flooding slot; and not switch the frequency channel to be used to transmit and receive a variable-length packet, which is a data packet, within the second flooding slot, but switching the frequency channel to be used to transmit and receive a variable-length packet between a plurality of the second flooding slots.

\* \* \* \* \*